United States Patent Office 3,234,411
Patented Feb. 8, 1966

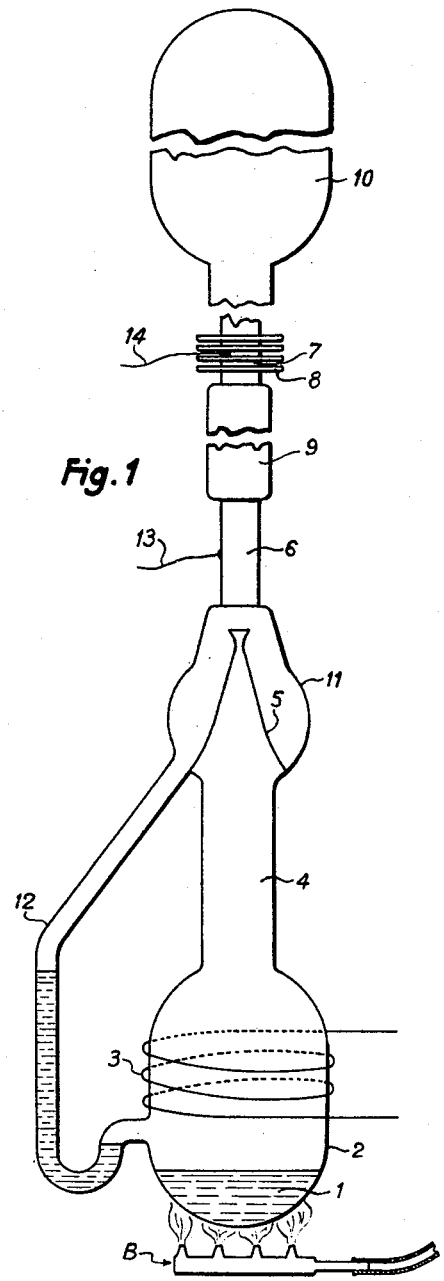

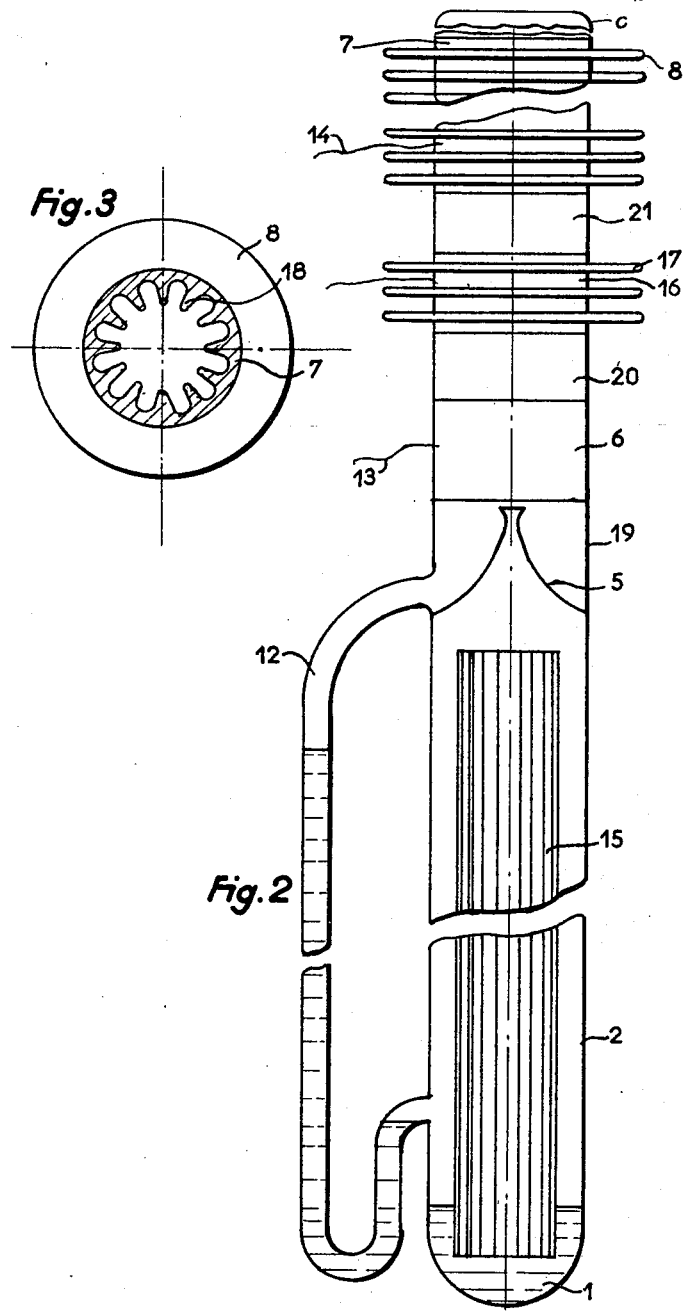

3,234,411
APPARATUS FOR CONVERTING THERMAL ENERGY INTO ELECTRIC ENERGY
Siegfried Klein, Paris, France, assignor to Commissariat a l'Energie Atomique, Paris, France, a corporation of France
Filed June 8, 1961, Ser. No. 133,281
Claims priority, application France, June 13, 1960, 829,817, Patent 1,267,863
7 Claims. (Cl. 310—4)

The present invention relates to the conversion of thermal energy into electric energy without use of moving parts.

The object of the invention is to provide a process and apparatus for converting thermal energy into electric energy which are very simple and have a suitable yield.

In said process, on the one hand, there is obtained a rapid and preferably supersonic jet of the vapour of a fluid between a first heated zone where there is assembled a mass of said fluid in the condensed state and a second cooled zone, by the use of a nozzle separating said two zones and by maintaining a high pressure difference between said two zones, which pressure difference is itself obtained by maintaining a suitable difference between the temperatures of the walls of said zones and, on the other hand, said ionized jet traverses a plurality of electrodes electrically connected to the apparatus utilizing the electric energy.

The electrodes collect the charges transported by the ionized jet. The last of the electrodes are energetically cooled since it is at their level that the ionized vapour transporting the positive charges is condensed, the electrons being collected above all by the first electrodes.

It would seem that this difference of behaviour is related to the higher rate of diffusion of the electrons.

An electric potential increasing from the first to the last electrodes is obtained. It would be of course possible to provide two different means for the collection of the positive ions and the condensation of the part of the non-ionized vapour. The electric power furnished increases with the number of electric charges passing through the nozzle per second. This number is the product of a flow multiplied by a degree of ionization. It is not possible to increase this degree of ionization much without this increase being compensated by the recombination of the ions. Thus, in accordance with the present invention, the flow is increased.

The ionization of the jet can be obtained by various methods. The most interesting thereof are the following two methods:

Contact with a surface brought to high temperature of about, for example, 2,000° C., the vapour used being that of a body having a low ionization potential such as cesium.

Irradiation by means of ionizing radiations.

These two methods can be used simultaneously if there is available a nuclear reactor having very high temperature, burning for example uranium carbide. But other methods are conceivable.

Vaporization of the fluid is obtained by heating in the known manner.

The main advantages of the invention are:

The apparatus is simple in construction and relatively cheap, since it comprises practically no complicated parts and requires no high precision machining.

Its operation requires but little supervision on condition that the adaptations thereof are within the skill of a technical specialist.

This apparatus can use any source of high temperature heat with a high thermodynamic efficiency.

The process is particularly adaptable to the use of energy furnished by nuclear reactors both in the form of heat and in the form of ionizing radiations.

Further features and advantages of the invention will be apparent from the ensuing description, with reference to the accompanying drawings to which the invention is in no way limited.

In the drawings:

FIG. 1 is an embodiment of an apparatus of experimental type according to the invention utilizing heat originating from a chemical combustion;

FIG. 2 is another embodiment of an apparatus according to the invention of industrial type utilizing energy provided by a nuclear reactor; for the sake of clarity, the outer case is shown to be transparent;

FIG. 3 is a cross-sectional view of the latter apparatus on a plane perpendicular to the axis thereof and at the level of one of the electrodes.

In the embodiment shown in FIG. 1, a mass of liquid 1, which is mercury in the presently-described embodiment, is contained in a reservoir 2 whose upper part is of glass and lower part of metal weldable to the glass, such as the metal known under the trade name "Kovar." Said mass 1 is heated by conventional burners B. The pressure created in the reservoir 2 by the vaporization of the mercury is about three centimetres of mercury. The upper part of the reservoir 2 is surrounded by a coil 3 constituted by three coils or turns carrying high frequency electric current. The electro-magnetic field produced ionizes the gas. The reservoir 2 is constituted at its upper part by a pipe 4 which conducts the vapour ionized by the coil 3 to a nozzle 5. The latter of conventional shape and also composed of glass, converts the pressure prevailing in the reservoir 2 into kinetic energy; in other words, it creates a supersonic jet of ionized mercury vapour. Said jet enters the upper part of the apparatus wherein prevails a pressure of some hundredths of a millimetre of mercury and traverses in succession the electrodes 6 and 7 composed of a metal weldable to the glass, such as said metal "Kovar." The upper electrode 7 is provided with cooling fins 8. The electrodes 6 and 7 are separated by the glass conduit 9, the electrode 7 is surmounted by a reservoir 10 also of glass. The mercury vapour condensed at 6, 9, 7 and 10 falls in the form of droplets into a bulb 11 of glass and returns by way of a pipe 12 to the reservoir 2.

Air is evacuated from the above-described assembly before operating.

Experience has shown that the electrode 6 becomes negative relative to the electrode 7.

The devices utilizing the electric energy produced are connected between the wires 13 and 14 respectively welded to the electrodes 6 and 7. The wire 14 corresponds to the positive terminal. The electric power collected depends above all on the following factors:

(1) The degree of ionization of the vapours constituting the jet.

(2) The velocity of the jet, this velocity depending on the pressure difference between the two zones and the shape of the nozzle 5.

(3) The respective temperatures of the electrodes 6 and 7, the intensity of the current received increasing when the temperature of the electrode 7 is lowered, as if this intensity were directly related to the amount of condensation on this electrode.

(4) Characteristics of the inner faces of the electrodes 6 and 7.

The intensity may be great despite the small degree of ionization of the jet, since the velocity of the latter increases the number of charges brought per second to the level of the electrodes 6 and 7.

It must, however, be noted that in this device, utilization of the high-frequency current for ionization is related to the experimental character of the embodiment.

FIG. 2 shows the liquid mass 1 of cesium, in this case contained in the reservoir 2 composed of melted alumina. Immersed in the mass 1 is the lower part of the combustible element 15 of a nuclear reactor constituted by other similar combustible elements separated by a moderator; for the sake of clarity, only the combustible element 15 has been shown.

The element 15 is constituted by uranium carbide that the nuclear fissions bring to a temperature of 1,500° C. At this temperature the cesium is not only vaporized but ionized. The degree of ionization is increased by the radiation of the fission products. Located above is the nozzle 5 also composed of melted alumina. The jet of ionized cesium defined by this nozzle traverses the electrodes 6, 16 and 7. The electrodes 16 and 7 comprise circular cooling fins 17 and 8 adapted to increase the exchanges of heat with the exterior cooling means.

The inner walls of these electrodes are provided with longitudinal fins, such as fin 13, adapted to increase their surface area and facilitate the condensation of the cesium vapours. The electrodes 6, 16 and 7 are composed of a metal which is a good conductor of heat and electricity. The electrode 7 is closed at its upper part at C. Located between the nozzle 5 and the various electrodes are conduits 19, 20 and 21 which have the same diameter as the reservoir 2 and the electrodes 6, 16 and 7. Said conduits are composed of melted alumina; the electrodes 6, 16 and 7 are fitted thereon and fluid tightness is obtained by conventional means.

The condensed cesium returns to the liquid mass 1 by way of the tube 12 of melted alumina.

The apparatus according to the presently-described embodiment and the apparatus shown in FIGS. 1–3, permit separating the positive and negative electric charges present in the jet of ionized gas and selectively collecting these charges on suitably placed electrodes. Said electrodes constitute a source of electric current of utility in an exterior load circuit.

Although a specific embodiment of the invention has been described, many modifications and changes may be made therein without departing from the scope of the invention as defined in the appended claims.

Having now described my invention what I claim as new and desire to secure by Letters Patent is:

1. In an apparatus for converting thermal energy into electric energy, in combination:
   (1) a first, substantially bulb-shaped, lower heated reservoir, the lower part of which is made of a metal weldable to glass, and the upper part of which is made of glass and is welded to said lower part; said lower reservoir having an axis;
   (2) a pool of a vaporizable and easily ionizable metallic substance contained in the lowermost part of said first reservoir;
   (3) heating means disposed outside said lowermost part for heating said pool and vaporizing said substance; the heating of said substance creating in said first lower reservoir a pressure of a few centimeters of mercury;
   (4) an electrically conductive helical coil, the turns of which are wound around the upper part of said first lower reservoir, said coil carrying a high frequency electric current, which produces an electro-magnetic field which ionizes the vapor of said substance;
   (5) a first glass tubular pipe extending from the uppermost end of, and coaxial with, said first lower reservoir, and communicating with the latter through an opening in said uppermost end; the diameter of said first tubular pipe being smaller than the maximum diameter of said bulb-shaped lower reservoir;
   (6) a second glass bulb integrally connected to the uppermost end of said first tubular pipe, coaxial with the latter and having a diameter greater than that of said first tubular pipe;
   (7) an upwardly directed glass venturi-nozzle, fitted within said second glass bulb and having its base secured to said uppermost end of said first tubular pipe, and being adapted to convert the pressure prevailing in said first lower reservoir into kinetic energy, thereby creating a supersonic jet of said ionized vapor;
   (8) a liquid collecting space formed between said venturi-nozzle and the walls of said second glass bulb;
   (9) said venturi-nozzle ejecting said ionized vapor into the upper part of said apparatus, in which a pressure of a few hundredths of a millimeter of mercury prevails, and which consists of the following elements, all coaxial with said first lower reservoir, and disposed one above the other:
      (a) a lower tubular electrode, the lower end of which is in open communication with the inner upper part of said second glass bulb;
      (b) an upper tubular electrode, above and at a distance from said lower electrode;
      (c) both electrodes being made of a metal weldable to glass;
      (d) a tubular glass conduit intermediate said lower and upper electrodes, the lower and upper ends of said conduit being respectively connected to and opening into the upper end of said lower electrode and the lower end of said upper electrode;
      (e) the diameters of said lower electrode, of said intermediate glass conduit and of said upper electrode being smaller than that of said second glass bulb;
      (f) a third bulb-shaped glass reservoir, of enlarged diameter relative to that of said electrodes, surmounting said upper electrode, the bottom of said third reservoir being in open communication with the upper inner end of said upper electrode;
      (g) a plurality of cooling fins affixed to the outer periphery of said upper electrode, for obtaining in the latter a temperature substantially lower than that of said lower electrode, and below the condensation temperature of said ionized vapor of said substance, said condensed vapor falling down in the form of a liquid into said liquid collecting space;
      (h) a liquid return pipe external to said second glass bulb and to said first lower reservoir, the lower and upper ends of said return pipe opening respectively into said first lower reservoir and said liquid collecting space;
      (i) a first conducting wire having one end attached to said upper electrode, and a second conducting wire having one end attached to said lower electrode.

2. An apparatus according to claim 1, in which said substance is mercury.

3. In an apparatus for converting thermal energy into electric energy, in combination:
   (1) a lower elongated hollow tubular reservoir, having an axis, made of melted alumina, and having a closed lower end and an open upper end;
   (2) a pool of a vaporizable and ionizable metallic substance contained in the lowermost part of said lower tubular reservoir;
   (3) inside said lower tubular reservoir, coaxial therewith, and having an outer diameter smaller than the inner diameter of said lower tubular reservoir, at least one fuel element of a nuclear reactor;
   (4) the bottom part of said fuel element being immersed in said pool;
   (5) said fuel element being brought by nuclear fissions to a temperature of several hundreds of degrees centigrade, said temperature being high enough to vaporize and ionize said substance, the ionization of the vapor thereof being increased by radiation of fission products;

(6) the ionized vapor rising inside said lower tubular reservoir to the upper end thereof;

(7) an upwardly directed venturi-nozzle, the base of which is integrally attached to the upper end of said lower tubular element, and being adapted to convert the pressure created inside said lower tubular reservoir by the vaporization of said substance into kinetic energy;

(8) a series of a plurality of tubular elements, extending from the upper end of said lower tubular reservoir, and connected together one above the other, the bottom of the lowest of said tubular elements being attached to the upper end of said lower tubular reservoir, all said connections being fluid-tight, said tubular elements having the same inner diameter as that of said lower reservoir, said series of tubular elements consisting of the following parts:

(a) a first lower conduit, within which said venturi-nozzle is fitted;

(b) a lower tubular electrode extending from said first lower conduit;

(c) a second tubular conduit extending from said lower electrode;

(d) a second tubular electrode extending from said second tubular conduit;

(e) a third tubular conduit extending from said second tubular electrode;

(f) a third and upper electrode extending from said tubular conduit and closed at its upper end;

(g) a plurality of external cooling fins affixed to said second and third electrodes, for cooling said ionized vapor to a temperature below its condensation temperature, thereby liquefying said vapor;

(9) a liquid collecting space formed between said venturi-nozzle and said first lower conduit, for receiving the condensed vapor falling downward through said series of tubular elements;

(10) a liquid return conduit, external to said lower reservoir and to said first lower conduit, having its upper end opening into said collecting space and its lower end opening into said lower reservoir, for returning the condensed vapor from said collecting space to said lower reservoir.

4. An apparatus as claimed in claim 3, in which said venturi-nozzle, said first lower conduit and said second and third conduits are made of melted alumina.

5. An apparatus as claimed in claim 3, in which said fuel element is made of uranium carbide.

6. An apparatus as claimed in claim 3, comprising further longitudinal cooling fins projecting inwardly from the inner walls of said electrodes, to increase their cooling area and facilitate the condensation of said vapor.

7. An apparatus as claimed in claim 3, in which said substance is cesium.

References Cited by the Examiner

UNITED STATES PATENTS 1,717,413   6/1929   Rudenberg.

FOREIGN PATENTS 1,161,079   3/1958   France.
841,613   6/1952   Germany.

OTHER REFERENCES

Comptes rendus des seances de l'academie des Sciences, vol. 251, pp. 657–659 of August 1, 1960, an article by S. Klein.

REUBEN EPSTEIN, *Primary Examiner.*

CARL D. QUARFORTH, *Examiner.*